United States Patent [19]
Nakajima et al.

[11] Patent Number: 5,815,755
[45] Date of Patent: Sep. 29, 1998

[54] CAMERA AND METHOD FOR SETTING A USED-STATE DISPLAY

[75] Inventors: Hidekazu Nakajima, Higashiosaka; Takahiro Ikeda, Kawachinagano, both of Japan

[73] Assignee: Minolta Co., Ltd., Osaka, Japan

[21] Appl. No.: 799,881

[22] Filed: Feb. 13, 1997

[30] Foreign Application Priority Data

Feb. 21, 1996 [JP] Japan ..................................... 8-033798
Feb. 21, 1996 [JP] Japan ..................................... 8-033799

[51] Int. Cl.$^6$ ..................................................... G03B 1/18
[52] U.S. Cl. ........................... 396/410; 396/515; 396/538
[58] Field of Search ..................................... 396/207, 390, 396/392, 410, 413, 514, 515, 535, 536, 538

[56] References Cited

U.S. PATENT DOCUMENTS 5,347,334  9/1994  Smart et al. .
5,457,510  10/1995  Yamazaki et al. .................. 396/538 X
5,612,760  3/1997  Okuno ..................................... 396/207

Primary Examiner—Howard B. Blankenship
Attorney, Agent, or Firm—Burns, Doane, Swecker & Mathis, LLP

[57] ABSTRACT

A camera is loadable with a film cartridge having a rotary spool connected with a film and a display member rotatable with the rotary spool for displaying a used state of the film. The camera includes: a driver which generates a driving force for rotation of the rotary spool; a transmission device which is operable to execute transmission of the driving force from the driver to the rotary spool; and a controller which controls the transmission device to execute the transmission of the driving force to rotate the rotary spool for rewinding of the film into the film cartridge, and to suspend the transmission of the driving force to allow the rewound film to freely loosen, and to execute the transmission of the driving force to rotate the rotary spool until the display member reaches a position to display a specified used state of the film.

19 Claims, 17 Drawing Sheets

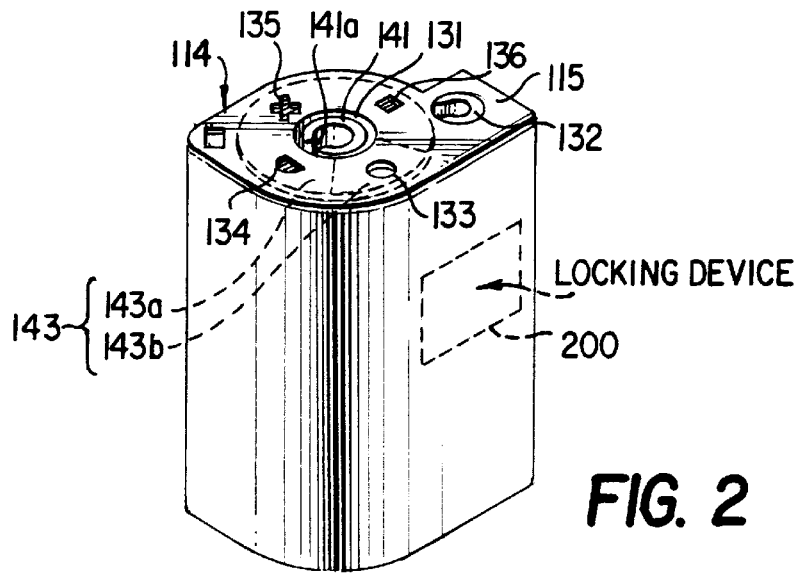
FIG. 2
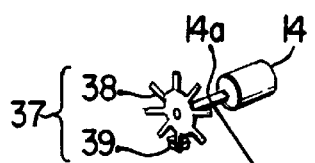
FIG. 7
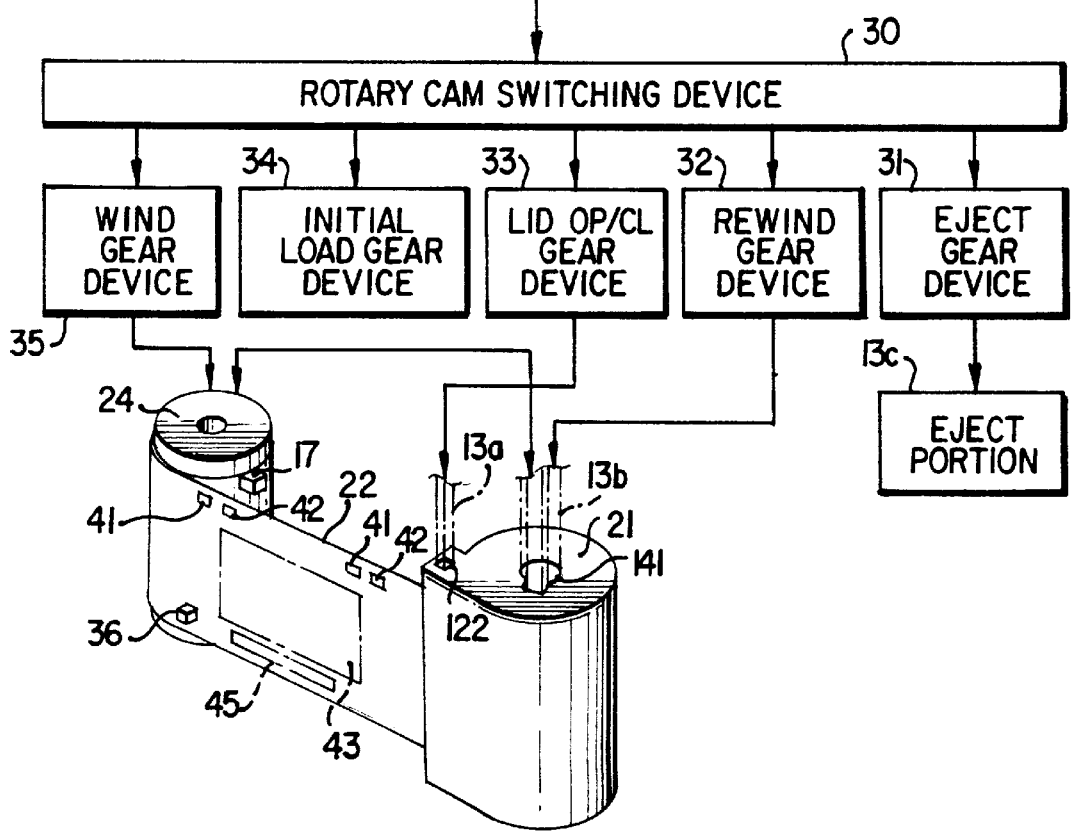

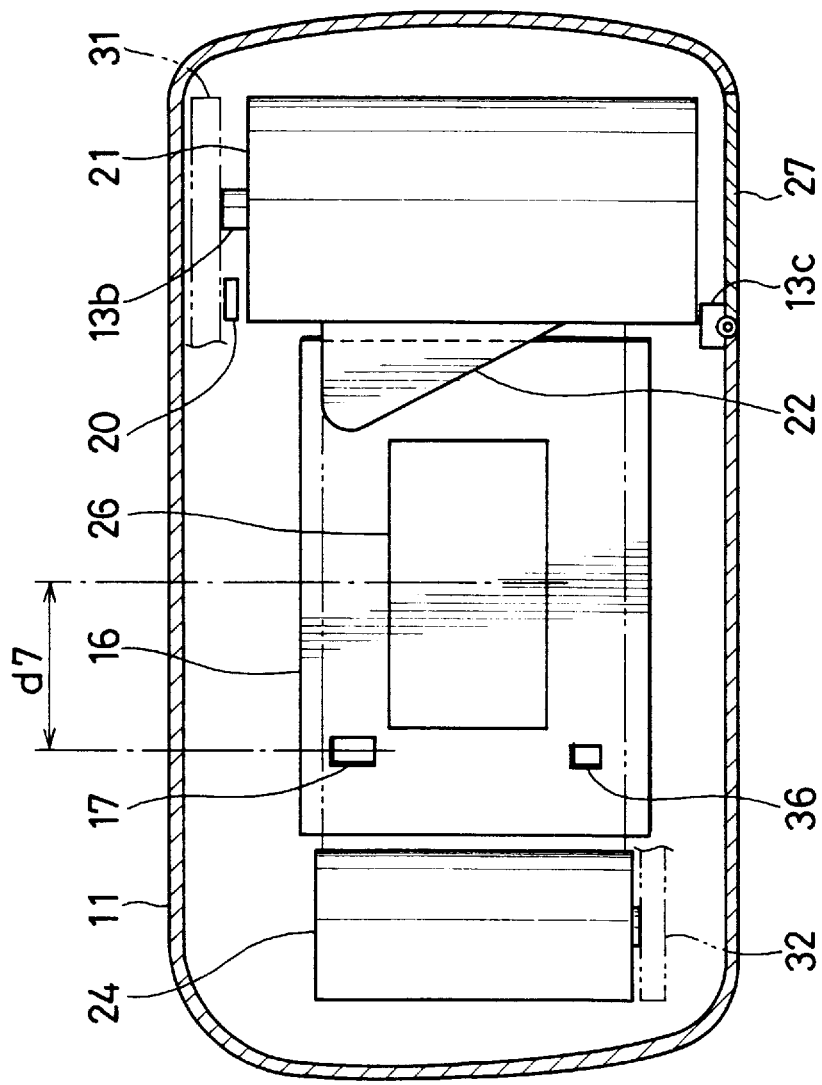

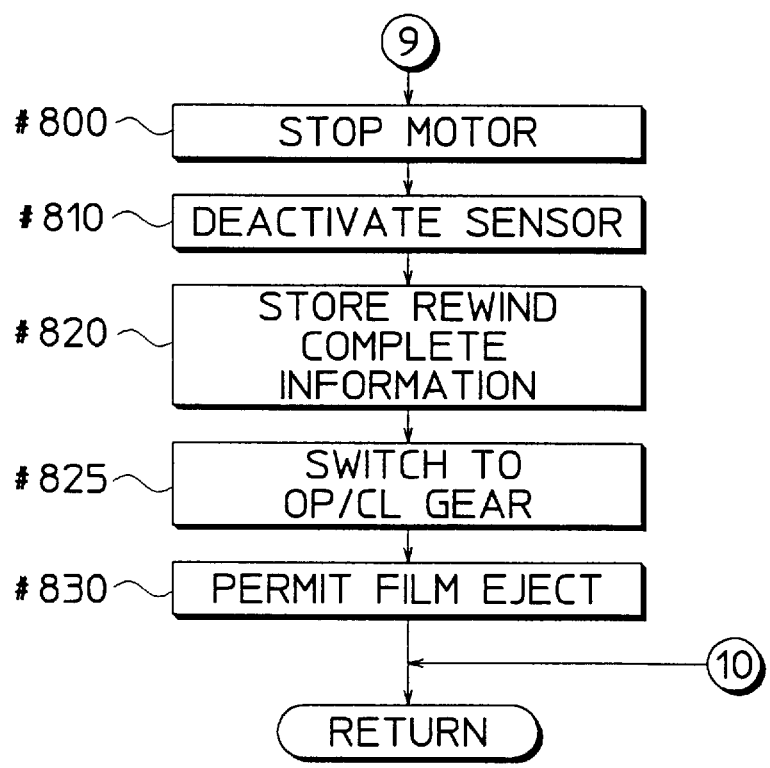

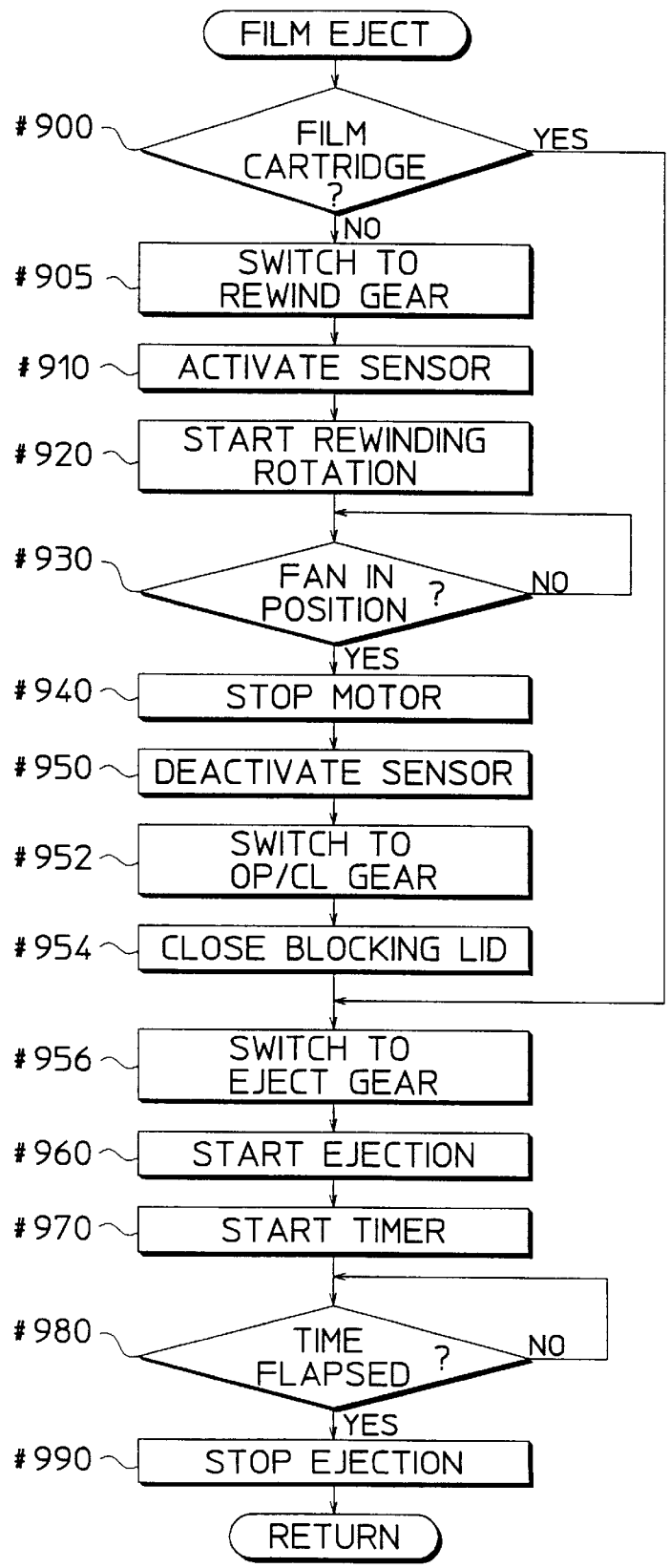

CAMERA AND METHOD FOR SETTING A USED-STATE DISPLAY

BACKGROUND OF THE INVENTION

This invention relates to a camera loadable with a novel film cartridge having a display disk displaying a used state of a film contained in the film cartridge.

In conventional cameras, an openable back lid is provided at the camer's main body. A film cartridge is loaded as follows. The back lid is first opened; the film cartridge is fitted in the camera main body; the leading end of a film is manually pulled out to a take-up spool; and the back lid is closed. Upon the completion of the rewinding after exposures are made to all frames of the film, the film is completely contained in the film cartridge. Accordingly, it is impossible with the conventional cameras to reuse a film which has been rewound into the film cartridge after being used only halfway for photographing.

A novel film cartridge is, as disclosed in U.S. Pat. No. 5,347,334, provided with a light blocking lid openably and closably at a film outlet thereof. Such a novel film cartridge can be taken out of the camera main body after a partly exposed film having been used only halfway for photographing is rewound, and the film can be used again for photographing.

The above novel film cartridge is provided with a data disk on which pieces of information concerning the film are recorded in the form of a bar code and a display disk which allows a camera operator to visually confirm a used state of the film. The data disk and the display disk are secured to the opposite ends of a spool of the film cartridge so as to be rotatable together with the spool. The display disk makes the used states of the film (an unexposed state, a partly exposed state, an exposed state and a developed state) distinguishable by its rotation stop position.

The novel film cartridge is provided with a locking mechanism for preventing the rotation of the spool after the light blocking lid is closed. Such a locking mechanism prevents the rotation of the display disk, thereby preventing the displayed used state of the film from changing.

Accordingly, in cameras in conformity with the novel film cartridge, it is necessary to keep the rotation stop position of the display disk unchanged until the spool is locked upon the closing of the light blocking lid.

SUMMARY OF THE INVENTION

It is an object of the present invention to provide a camera which has overcome the problems residing in the prior art.

It is another object of the present invention to provide a camera which enables an accurate display of a used state of a film by a display disk of a film cartridge.

According to an aspect of the present invention, a camera loadable with a film cartridge has a rotary spool connected with a film and a display member rotatable with the rotary spool for displaying a used state of the film. The camera comprises: a driver which generates a driving force for rotation of the rotary spool; a transmission device which is operable to execute transmission of the driving force from the driver to the rotary spool; and a controller which controls the transmission device to execute the transmission of the driving force to rotate the rotary spool for rewinding of the film into the film cartridge, and to suspend the transmission of the driving force to allow the rewound film to freely loosen, and to execute the transmission of the driving force to rotate the rotary spool until the display member reaches a position to display a specified used state of the film.

The camera is provided with a take-up spool which winds the film from the film cartridge. In this case, it may be appreciated that the transmission device executes transmission of the driving force from the driver to the take-up spool, and the controller controls the transmission of the driving force to the take-up spool in combination with the transmission of the driving force to the rotary spool.

The camera may be further provided with a locking device which locks the display member in the position to display the specified used state of the film.

The display member may be provided with a plurality of colors to define a used state of the film. Also, the display member may be preferably placed in a casing formed with an opening to display a used state of the film in a combination of the plurality of colors and the opening.

Also, the display member may be made to display an unexposed state, a partly exposed state, a completely exposed state, and a developed state of the film.

Further, the display member may be provided with a plurality of colors and placed in a casing formed with four openings having different shapes from one another. The four colors are provided in such an arrangement that the same color is seen through the three openings while a different color is seen through the remaining one opening.

According to another aspect of the present invention, a camera loadable with a film cartridge has a rotary spool connected with a film and a display member rotatable with the rotary spool. The display member is provided with a plurality of colors and is placed in a casing formed with a plurality of openings having different shapes from one another to display a used state of the film in a combination of the plurality of colors and the plurality of openings. The camera further comprises: a motor which generates a driving force for rotation of the rotary spool; a transmission mechanism including: transmission gears, and a connector provided between transmission gears for connecting and disconnecting gears to execute and suspend transmission of the driving force from the motor to the rotary spool; a controller which controls the connector to connect the transmission gears to execute the transmission of the driving force to the rotary spool for rewinding of the film into the film cartridge, and to disconnect the transmission gears to suspend the transmission of the driving force to allow the rewound film to freely loosen, and to connect the transmission gears to execute the transmission of the driving force to rotate the rotary spool until the display member reaches a position to display a specified used state of the film; and a locking device which locks the display member in the position to display the specified used state of the film.

According to still another aspect of the present invention, a camera loadable with a film cartridge has a rotary spool connected with a film and a display member rotatable with the rotary spool for displaying a used state of the film. The camera comprises: an ejector which ejects the loaded film cartridge; an operating member which commands a film cartridge ejection of the ejector; a driver which drives the rotary spool; and a controller which is responsive to the operating member and controls the driver to rotate the rotary spool until the display member reaches a position to display a specified used state of the film when the operating member is activated.

The camera may be further provided with a locking device which locks the display member in the position to display the specified used state of the film.

According to yet still another aspect of the present invention, a camera loadable with a film cartridge has a rotary spool connected with a film and a display member rotatable with the rotary spool, the display member being provided with a plurality of colors and placed in a casing formed with a plurality of openings having different shapes from one another to display a used state of the film in a combination of the plurality of colors and the plurality of openings. The camera comprises: an ejector which ejects the loaded film cartridge; a switch which commands a film cartridge ejection of the ejector; a motor which drives the rotary spool; a controller which is responsive to the switch and controls the motor to rotate the rotary spool until the display member reaches a position to display a specified used state of the film when the switch is activated; and a locking device which locks the display member in the position to display the specified used state of the film.

According to further aspect of the present invention, a method for actuating a display member rotatable with a film-connected rotary spool of a film cartridge loaded in a camera to display a used state of the film comprises the steps of: rotating the rotary spool to rewind the film into the film cartridge; suspending the rotation of the rotary spool to allow the rewound film to freely loosen; and rotating the rotary spool until the display member reaches a position to display a specified used state of the film.

Further, it may be appreciated to lock the display member in the position after the rotary spool is rotated to display a specified used state of the film.

According to still further aspect of the present invention, a method for actuating a display member rotatable with a film-connected rotary spool of a film cartridge loaded in a camera to display a used state of the film comprises the steps of: checking whether the film cartridge is commanded to be ejected; rotating the rotary spool until the display member reaches a position to display a specified used state of the film when the film cartridge is commanded to be ejected; and ejecting the film cartridge.

Further, it may be appreciated to lock the display member in the position before the film cartridge is ejected.

These and other objects, features and advantages of the present invention will become more apparent upon a reading of the following detailed description and accompanying drawings.

BRIEF DESCRIPTION OF THE DRAWINGS

FIG. 2 is a perspective view of the film cartridge turned upside down;

FIG. 6 is a schematic diagram showing an internal construction of the camera main body when viewed from behind;

FIG. 7 is a construction diagram of a drive system of the camera;

FIGS. 17 and 18 are a flowchart showing subroutines "Error Processing" executed in Step #380 of the "Initial Load" subroutine and Step #640 of the "One-Frame Winding" subroutine, "Second Error Processing" executed in Step #650 of the "One-Frame Winding" subroutine, and "Error Rewinding" executed in Step #108 of the main routine; and FIG. 19 is a flowchart showing a subroutine "Film Eject" executed in Step #170 of the main routine.

DETAILED DESCRIPTION OF THE PREFERRED EMBODIMENTS OF THE INVENTION

Figure 1:
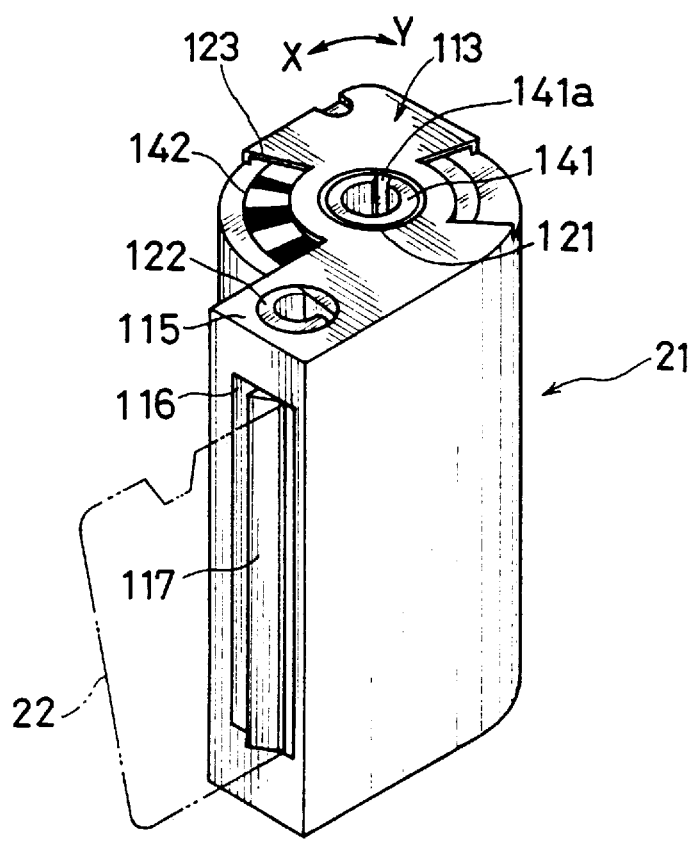
FIG. 1 is a perspective view of a film cartridge used in a camera according to the invention.

Hereafter, an embodiment of a camera according to the invention is described with reference to the accompanying drawings. FIG. 1 is a perspective view of a film cartridge used in a camera according to the invention, and FIG. 2 is a perspective view of the film cartridge turned upside down.

In this film cartridge, a film 22 is completely contained in a film cartridge 21. The film cartridge 21 has a tubular shape provided with an upper plate 113 and a bottom plate 114. A film pull-out portion 115 projects from a side surface of the film cartridge 21 parallel to its shaft. A film outlet 116 is formed at a leading end face of the film pull-out portion 115, and a rotatable light blocking lid 117 is provided at the film outlet 116.

The upper plate 113 of the film cartridge 21 is provided with a round hole 121 formed in the center of the shaft, a keyhole 122 formed at the leading end of the film pull-out portion 115, and fan-shaped notches 123 formed in specified positions of its peripheral portion. On the other hand, the bottom plate 114 of the film cartridge 21 is provided with a round hole 131 formed in the center of the shaft, a keyhole 132 formed at the leading end of the film pull-out portion 115, and openings 133, 134, 135, 136 evenly spaced on a circle having a specified diameter from the center of the shaft. The openings 133, 134, 135, 136 are in the form of a circle, semicircle, cross and rectangle, respectively so as to enable a camera operator to visually confirm a used state of the film 22 contained in the film cartridge 21.

In the center of the film cartridge 21, a spool 141 for winding and rewinding the film 22 is rotatably provided. The spool 141 is formed with a groove 141a. A data disk 142 to be described later and a display disk 143 are adhered to upper and lower faces of the spool 141, respectively so as to rotate integrally with the spool 141.

The display disk 143 is divided into a wide-angle fan-shaped portion 143a and a narrow-angle fan-shaped portion 143b by different colors as indicated by broken line in FIG. 2. Specifically, the fan-shaped portions 143a, 143b are colored by black and white, respectively. The center angle of the narrow-angle fan-shaped portion 143b is set such that the fan-shaped portion 143b does not cover two neighboring ones of the openings 133, 134, 135, 136 simultaneously (90° or smaller in this embodiment).

The rotational phase of the display disk 143 is set as follows. If the film 22 contained in the film cartridge 21 is unused or unexposed, the narrow-angle fan-shaped portion 143b is opposed to the opening 133. If the film 22 is used halfway or partly exposed, the fan-shaped portion 143b is opposed to the opening 134. If the film 22 is used to the last frame or completely exposed, the fan-shaped portion 143b is opposed to the opening 135. If the film 22 is already developed, the fan-shaped portion 143b is opposed to the opening 136. In FIG. 2, the film 22 is unexposed.

The film cartridge 21 is also provided with an locking mechanism 200 for locking the spool 141 to prevent its rotation when the film outlet 116 is closed by the light blocking lid 117. This locking mechanism prevents an error confirmation of the camera operator concerning the used state of the film 22 which results from a displacement of a rotation stop position of the display disk 143. It should be noted that the locking mechanism does not lock the spool 141 while the film outlet 116 is released by opening the light blocking lid 117.

Figure 3:
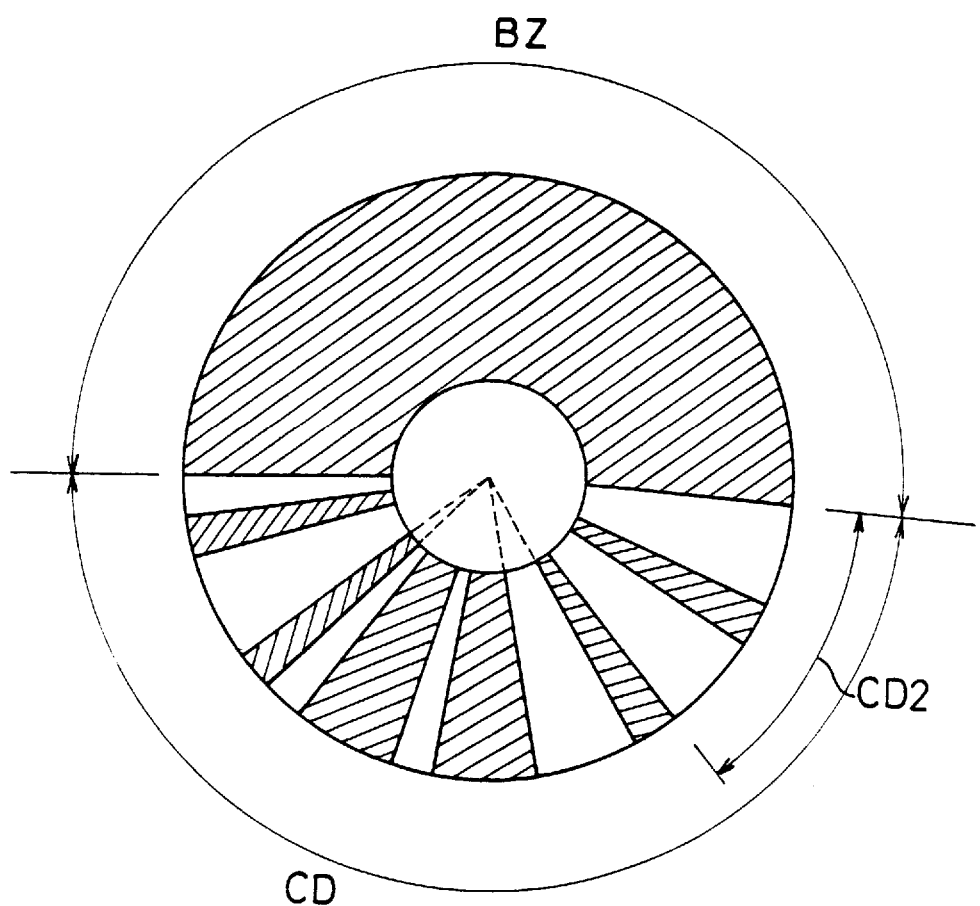
FIG. 3 is a plan view of a radial bar code recorded on a data disk.

FIG. 3 is a plan view of a radial bar code recorded on the data disk 142.

The data disk 142 is divided into a black zone BZ where the entire surface is black, and a code zone CD in which pieces of information are coded. The black zone BZ has a large area defined by a relatively wide center angle and is used for detecting a start position of the code zone CD. In the code zone CD, film sensitivity, an information as to whether the film is a color film or black-and-white film, and an information as to whether the film is a positive or negative film are recorded by combinations of bar and spaces. In an area CD2 of the code zone CD, a code concerning the total frame number is recorded by a total of three bar(s) and space(s).

Figure 4:
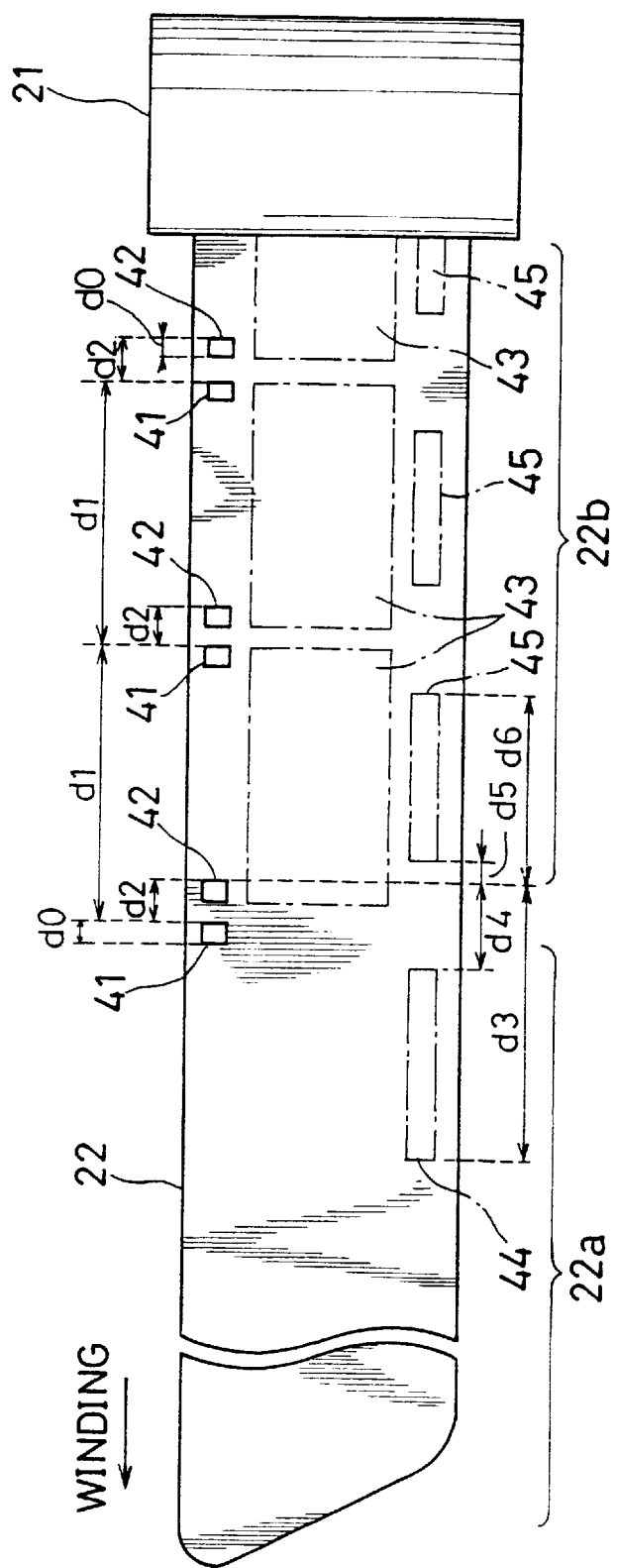
FIG. 4 is a diagram showing a configuration of a film.

FIG. 4 is a diagram showing a construction of the film 22.

The film 22 is divided into three areas, i.e. a leader portion 22a, an exposure portion 22b and an end portion 22c from its leading end (left end in FIG. 4). The leader portion 22a is used to pull the film 22 out of the cartridge 21. The exposure portion 22b is an area where a specified number of images are recorded at regular intervals. The end portion 22c is provided to pull the film 22 by a specified length from the cartridge 21 so as to enable the recording of an image in the last frame of the frame portion 22b.

Pairs of identical rectangular perforations 41, 42 are regularly formed along an edge of the film 22 at one side with respect to a widthwise direction of the film 22. Frames 43 in which photographed images are recorded are provided between perforations 41 and 42. The perforations 41 act as a stop position reference during the winding of the film 22, whereas the perforations 42 act as an arrangement position reference for magnetic recording portions 44 and 45 to be described later.

A length of the perforations 41, 42 with respect to a film winding direction is set at d0; a distance between neighboring perforations 41 at d1; and a distance between each pair of perforations 41 and 42 is set at d2 (where d2<d1–d2).

At the other end (lower end in FIG. 4) of the film 22 with respect to its widthwise direction, a leader magnetic recording portion 44 and a plurality of frame magnetic recording portions 45 are provided. The leader magnetic recording portion 44 is provided in the leader portion 22a so as to record a title of the film and an information concerning the orientation of the photographed pictures with respect to the perforations and like information.

The frame magnetic recording portions 45 are arranged in the vicinity of and below the respective frames 43 of the exposure portion 22b so as to record specified pieces of information concerning the photographed images such as a date of photographing, a framing information (vertically framed/horizontally framed), an exposure control value, a magnification, an angle of view, a light source and the number of prints to be made.

The areas of the leader magnetic recording portion 44 and of the frame magnetic recording portions 45 are set based on distances from the right edges of the corresponding perforations 42. More specifically, the front and rear ends of the leader magnetic recording portion 44 are spaced apart from the right edge of the leading perforation 42 by distance d3 and distance d4, respectively. Further, the front and rear ends of each frame magnetic recording portion 45 are spaced apart from the right edge of the corresponding perforation 42 by distances d5 and d6, respectively.

Figure 5:
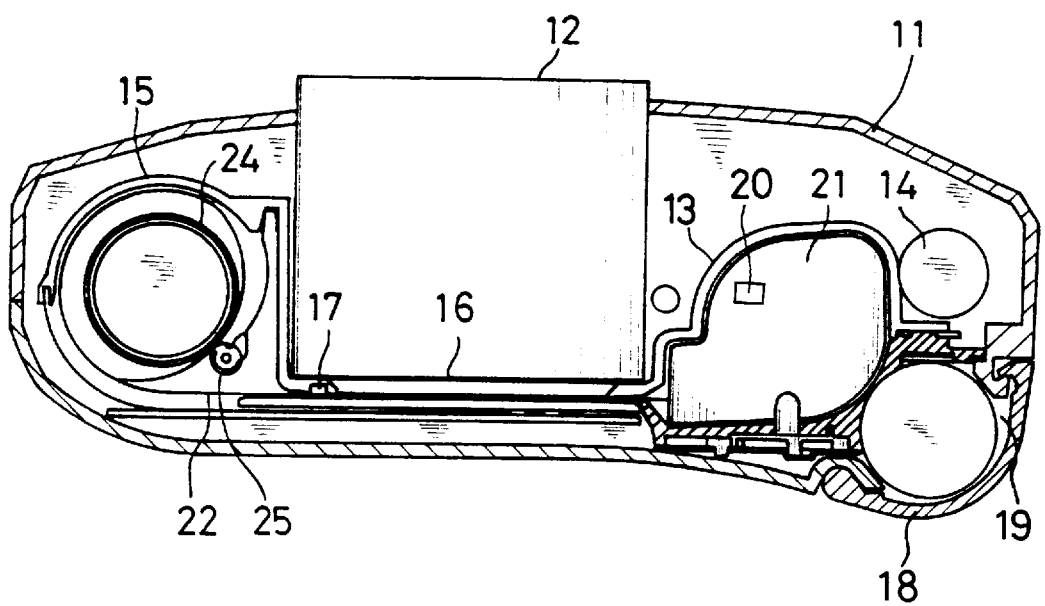
FIG. 5 is a schematic diagram showing an internal construction of a camera main body when viewed from above.

FIGS. 5 and 6 are schematic diagrams showing the internal construction of a camera main body when viewed from above and behind, respectively. FIG. 7 is a construction diagram of a drive system of the camera.

A camera main body 11 is provided, as shown in FIG. 5, with a taking lens unit 12 including an unillustrated taking lens arranged substantially in the center of the camera main body 11, a cartridge chamber 13 arranged at the right side of the taking lens unit 12, a motor 14 arranged at the right side of the cartridge chamber 13 as a drive source for, e.g. driving a film, a film take-up chamber 15 arranged at the left side of the taking lens unit 12, an exposure frame 16 arranged behind the optic axis of the taking lens unit 12, a perforation sensor (hereinafter, "PS") 17, and a battery chamber 19 arranged at a right end portion for accommodating a battery 18.

Figure 10:
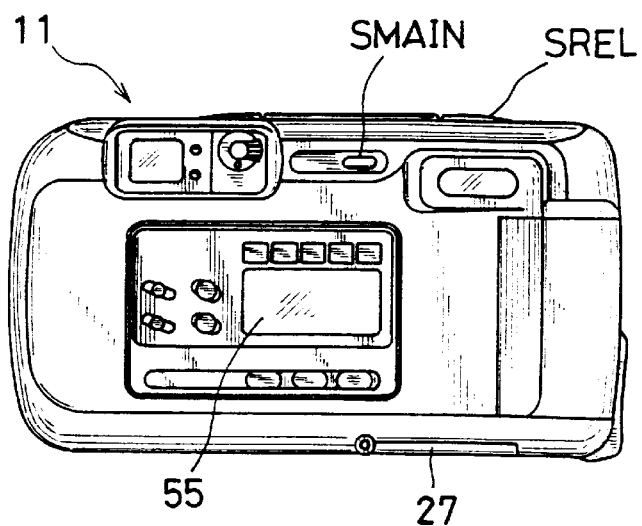
FIG. 10 is a rear view of the camera main body.

The cartridge chamber 13 is adapted to load a film cartridge 21, and its opening is closable by a cover 27 (see FIG. 10). In the cartridge chamber 13, there are arranged an opening key 13a (see FIG. 7) for opening and closing the light blocking lid 117, a drive key 13b (see FIG. 7) which engages the groove 141a of the spool 141 to rotate the spool 141, and an eject portion 13c for releasing the cover 26 and ejecting the film cartridge 21 by pulling the film cartridge 21 out to a position where it can be taken out by an unillustrated eject lever.

Further, as shown in FIG. 5, the cartridge chamber 13 is provided with a code reading sensor 20 arranged at its upper portion. The sensor 20 includes a reflection type optical sensor or the like and is arranged in such a position where it faces the notch 123 when the film cartridge 21 is loaded in order to read the bar code on the data disk 142.

The film take-up chamber 15 is provided with a take-up spool 24 for winding the film 22 and a cylindrical film presser 25 which is so arranged as to be in contact with the outer surface of the take-up spool 24 with a specified pressure. The take-up spool 24 has a cylindrical shape as shown in FIG. 7 and is rotatably provided in the film take-up chamber 15.

As shown in FIG. 6, the exposure frame 16 is a laterally long frame and is provided with an exposure aperture 26 formed on the optic axis of the taking lens unit 12 (see FIG. 5). This exposure aperture 26 has a rectangular shape of a specified aspect ratio, and is adapted to restrict an exposure area of the film.

The PS 17 includes an optical sensor of reflection or transmission type, and controls the feed of the film by detecting the perforations 41, 42 (see FIG. 4) formed in the film. The arrangement position of the PS 17 is described later.

A shaft 14a of the motor 14 is, as shown in FIG. 7, connected with an eject gear device 31, a rewind gear device 32, a lid opening/closing gear device 33, an initial load gear device 34 and a wind gear device 35 via a rotary cam switching device 30. The eject gear device 31 is coupled with the eject portion 13c; the rewind gear device 32 with the drive key 13b; the lid opening/closing gear device 33 with the opening key 13a; the initial load gear device 34 with the drive key 13b and the take-up spool 24; and the wind gear device 35 with the take-up spool 24. Each of the gear devices 31 to 35 includes gears so coupled as to be rotatable in forward and reverse directions, and is adapted to transmit a torque of the motor 14 at a specified reduction ratio to the part(s) coupled therewith.

The rotary cam switching device 30 includes a cam gear coupled with the motor shaft 14a via an unillustrated one-way clutch. The connection of the motor shaft 14a with the respective gear devices 31 to 35 is switched by driving the motor 14.

A rotation sensor 37 is mounted on the motor shaft 14a as shown in FIG. 7. The rotation sensor 37 is constructed by a pulse encoder including a disk 38 which has detection pieces circumferentially arranged at regular intervals and projecting radially outward from its periphery and an optical sensor 39 of reflection or transmission type for detecting the passage of the detection pieces. The rotation sensor 37 detects a rotation amount of the motor 14.

The rotation sensor 37 may be constructed by a pulse encoder which includes a disk formed with circumferentially spaced slits at regular intervals and an optical sensor for detecting the passage of the slits.

The camera main body 11 is provided with a magnetic head 36 arranged to the left of and below the exposure aperture 26 as shown in FIG. 6. The magnetic head 36 is, as shown in FIG. 7, opposed to the film 22 and is located below the PS 17 and at a height where the magnetic recording portions 44, 45 pass so as to record the magnetic data. The magnetic head 36 also reads the magnetic data recorded in the magnetic recording portions 44, 45.

The camera main body 11 is also provided with an unillustrated moving mechanism for moving the magnetic head 36 between a recording/reproducing position where the head surface of the magnetic head 36 is in contact with or in the vicinity of the surface of the film 22 and a retracted position spaced apart from the recording/reproducing position. The magnetic head 36 is located in the recording/reproducing position only during the recording and reading of the magnetic data.

Figure 8:
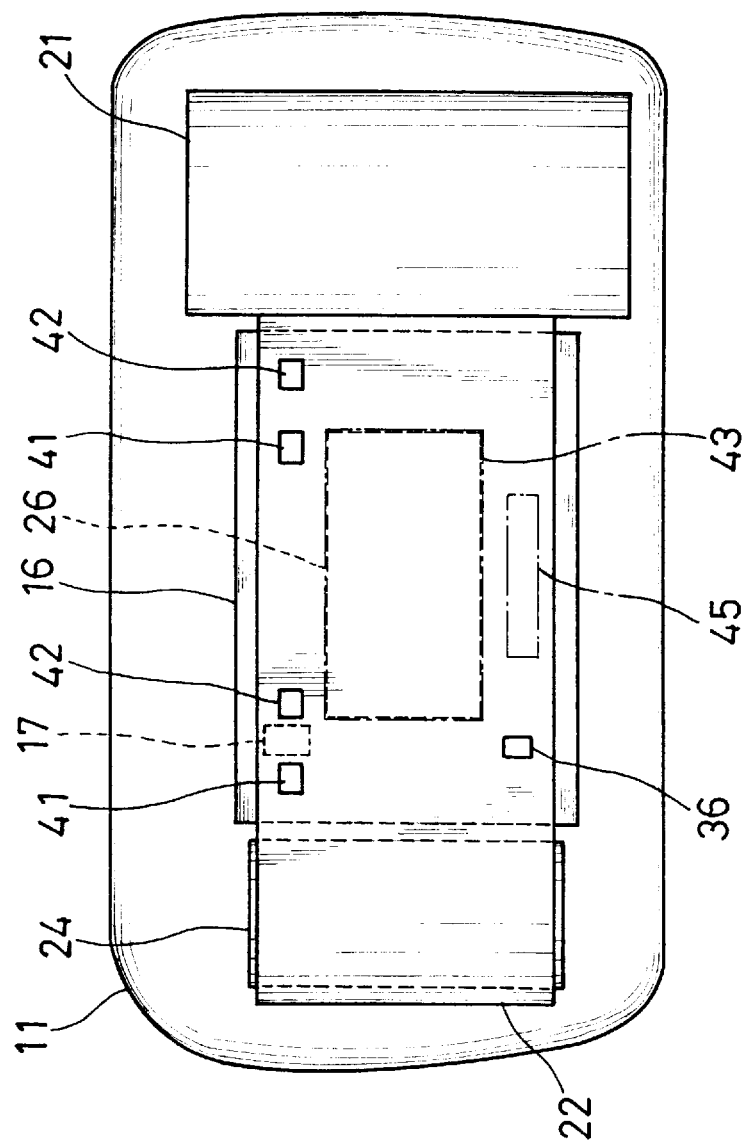
FIG. 8 is a schematic diagram showing an internal construction of the camera main body when viewed from behind, where the film is located in an image recording position.

Next, the position of the PS 17 is described with reference to FIGS. 6 and 8. FIG. 8 is a schematic diagram showing the internal construction of the camera main body when viewed from behind, where the film 22 is located in an image recording position.

The PS 17 is located at a height where it can detect the passage of the perforations 41, 42 as shown in FIG. 8, and the detection point thereof is displaced forward from a center line of the exposure aperture 26 by distance d7 with respect to the film winding direction as shown in FIG. 6.

As shown in FIG. 8, the detection point of the PS 17 is located in the middle between the perforations 41, 42 when one frame of the film 22 is located in the image recording position. Further, a feed stop control in one frame feed of the film 22 after the photographing operation is performed by detecting the edge of the perforation 41 by the PS 17.

Figure 9:
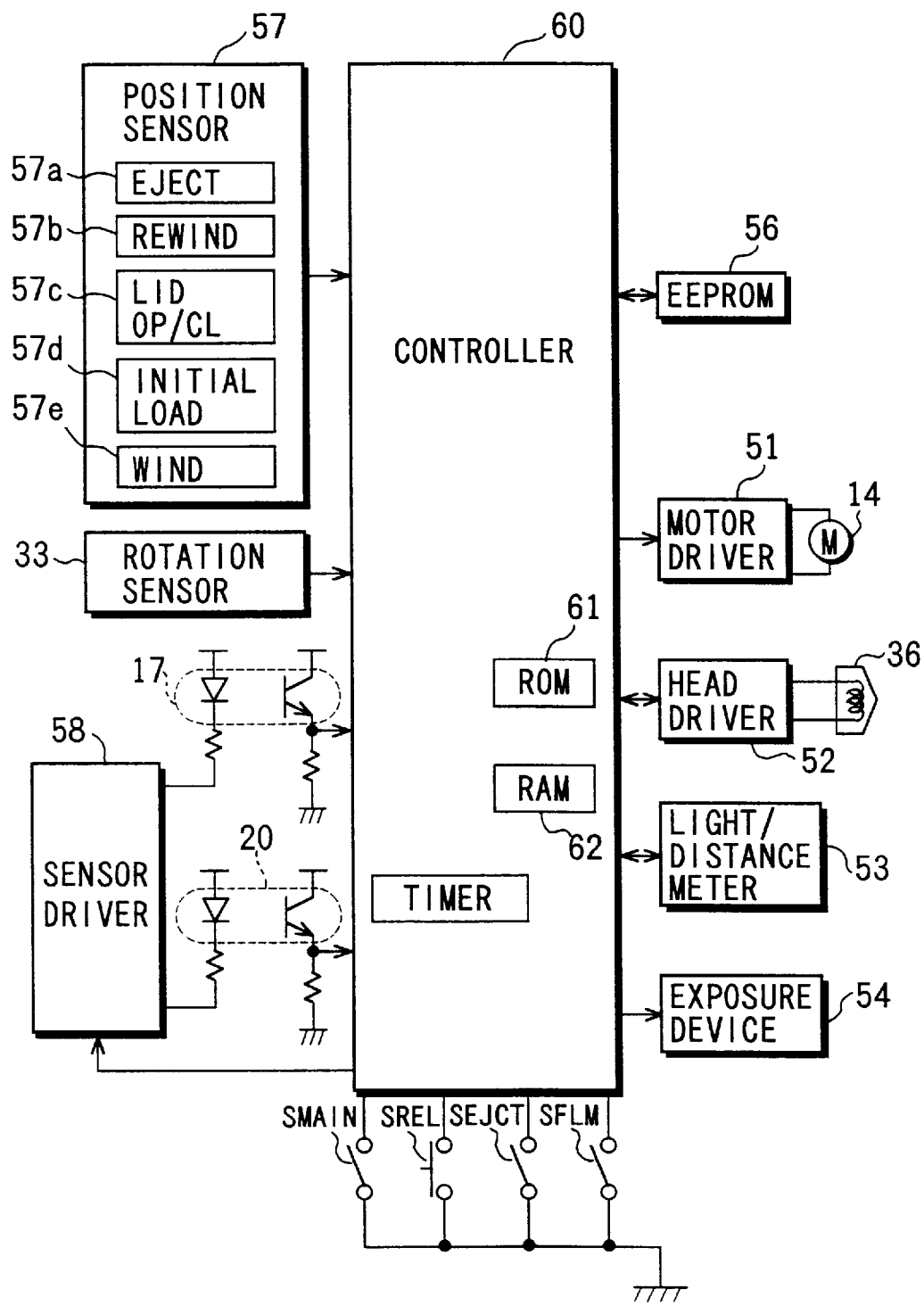
FIG. 9 is a block diagram of a control system of the camera.
Figure 11:
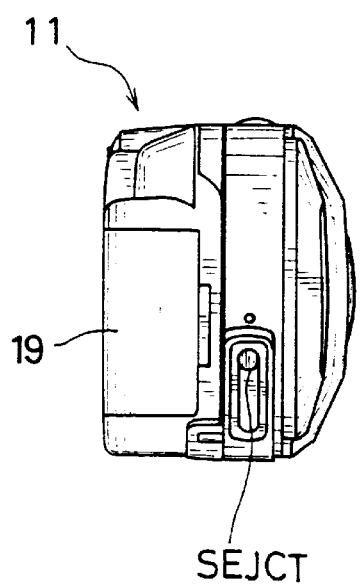
FIG. 11 is a right side view of the camera main body.

FIG. 9 is a block diagram of a control system of the camera; FIG. 10 is a rear view of the camera main body; and FIG. 11 is a right side view of the camera main body.

A motor driver 51 supplies a drive current to the motor 14. When the rotation of the motor 14 is to be stopped, the motor driver 51 applies plugging to the motor 14, i.e. reverses the connections of the motor 14 to stop the motor 14 within a short period of time. Depending upon the conditions, the motor driver 51 is also capable of performing a motor stop control which is a combination of a short-circuit braking by short-circuiting the opposite ends of the motor 14 and a natural braking by disconnecting the opposite ends of the motor 14.

A magnetic head driver 52 intermittently supplies a current to the magnetic head 36 to cause the magnetic head 36 to record data in the magnetic recording portions 44, 45. A supply current is controlled by a controller 60. When the magnetic data is read by the magnetic head 36, it is magnetically picked up and sent to the controller 60.

More specifically, the magnetic data is read as follows. By feeding the film 22, a magnetic field generated at a gap of the magnetic head 36 varies due to the magnetic data recorded in the magnetic recording portions 44, 45. A voltage in proportion to a rate of change in magnetic flux caused by this variation of the magnetic field is induced in a coil inside the magnetic head 36. The induced voltage is sent to the controller 60, and the magnetic data is read by detecting the level of the induced voltage.

A light/distance meter 53 measures a brightness of an object and a distance to the object. An exposure device 54 causes the film to be exposed based on the measurement results of the light/distance meter 53. A display device 55 includes a LCD panel or the like and is arranged substantially in the center of the rear surface of the camera main body 11 as shown in FIG. 10 for displaying a film counter stored in a RAM 62, an information as to whether or not the film is loaded and a variety of other data.

An EEPROM (electrically erasable and programmable ROM) 56 is an electrically reloadable nonvolatile memory. A cam position sensor 57 is arranged in connection positions of the motor shaft 14a with the respective gear devices 31 to 35 via the rotary cam switching device 30, i.e. an eject position 57a, a rewind position 57b, a lid opening/closing position 57c, an initial load position 57d and a wind position 57e. The cam position sensor 57 detects which of the gear devices 31 to 35 is coupled with the motor shaft 14a. A sensor driver 58 is adapted to supply a power to LEDs of the PS 17 and the code reading sensor 20.

The controller 60 is constructed by a microcomputer or the like having a ROM 61, a RAM 62 and a timer function. The controller 60 controls the operation of the camera as shown in flowcharts of FIGS. 12 to 19 to be described later. The RAM 62 is adapted to temporarily store a variety of data. Specifically, the RAM 62 stores data on the data disk 142 which are read by the code reading sensor 20, the film counter which indicates the frame number of the film, and a spool rotation counter which indicates the number of rotation of the spool 141. The ROM 61 is adapted to store a control program, the number of rotation of the spool 141 necessary to rewind the film having wound to the last frame (40th frame in this embodiment), a variety of set values and the like.

The controller 60 controls the switching of the gear devices 31 to 35 to be connected with the motor 14 using a detection signal from the cam position sensor 57.

At the start and end of the winding and rewinding of the film 22, the controller 60 causes such an information to be stored in the EEPROM 56. In this way, when a new battery 18 is loaded, whether or not the film was being fed when the previous battery was taken out can be discriminated. The EEPROM 56 may be provided with a feed flag indicative of the feed of the film. This feed flag is set at the start of winding and rewinding while being reset at the end of winding and rewinding. In this way, the feed flag may be read.

The controller 60 detects the perforations 41, 42 and the read the data on the data disk 142 based on the level of the signals input from phototransistors of the PS 17 and the code reading sensor 20 during the supply of power to the LEDs of the PS 17 and the code reading sensor 20 by the sensor driver 58.

The controller 60 also controllably switches a rewind mode between a first rewind mode in which the rewinding of the film 22 is controlled by detecting the perforations 41, 42 by the PS 17 and a second rewind mode in which the rewinding of the film 22 is controlled by detecting the data on the data disk 142 by the code reading sensor 20.

In the first rewind mode, the controller 60 causes a numerical value of the film counter stored in the RAM 62 to be displayed in the display device 55. On the other hand, in the second rewind mode, the controller 60 causes a numerical value of the spool rotation counter stored in the RAM 62 together with a sign "+" to be displayed in the display device 55. In this way, which of the first rewind mode and the second rewind mode is set can be known to the camera operator.

To the controller 60 are connected a main switch SMAIN, a release switch SREL, an eject switch SEJCT and a film switch SFLM. The controller 60 controls the operation of the respective elements in accordance with the states of these switches.

The main switch SMAIN is disposed in an upper middle part of the rear surface of the camera main body 11 as shown in FIG. 10 and is operated to permit and prohibit a photographing operation. The release switch SREL is arranged at a right end of the upper surface of the camera main body 11 as shown in FIG. 10 and is operated to perform the photographing operation.

The eject switch SEJCT is arranged at a bottom part of the right side surface of the camera main body 11 as shown in FIG. 11 and is operated to release the cover 26 to take out or load the film cartridge 21.

The film switch SFLM is adapted to detect the presence or absence of the film cartridge 21 in the cartridge chamber 13, and is on when the film cartridge is not loaded while being off when the film cartridge is loaded.

The display in the display device 55 in the second rewind mode is not limited to the addition of the sign "+" provided that it is distinguishable from the display in the first rewind mode. Other signs or letters may be used, or only an indication that the film is being rewound may be made without displaying any numerical value.

Next, the operation of the camera constructed as above is described.

When the film cartridge 21 is loaded in the cartridge chamber 13, the motor 14 is connected with the lid opening/closing gear device 33, and the opening key 13a is fitted into the key hole 122. Then, the opening key 13a is rotated to open the light blocking lid 117 and the locking of the spool 141 by the locking mechanism is released.

Further, the drive key 13b provided inside is engaged with the groove 141a of the spool 141. Since the positional relationship of the data disk 142 and the narrow-angle fan-shaped portion 143b is fixed, the position of the narrow-angle fan-shaped portion 143b or the state of the film 22 can be detected by detecting an angle defined by a reading start position and an end of the black zone BZ on the data disk 142 when the film cartridge 21 is loaded while the bar code on the data disk 142 is read by the code reading sensor 20.

As described above, since the display disk 143 is secured to the spool 141, the positional relationship of the narrow-angle fan-shaped portion 143b and the groove 141 does not change. Accordingly, the position of the narrow-angle fan-shaped portion 143b or the state of the film 22 can be detected by phase-detecting the rotational angle position of the drive key 13b when the drive key 13b is engaged with the groove 141a of the spool 141 using a rotary encoder rotatable together with the drive key 13b or the like.

When the spool 141 is rotated in a direction of arrow Y in FIG. 1, the film 22 is fed through the film outlet 116 of the film cartridge 21. When the spool 141 is rotated in a direction of arrow X in FIG. 1, the film 22 is rewound into the film cartridge 21. While the spool 141 is rotated in the X-direction, the bar code on the data disk 142, i.e. the information concerning the film 22 is read by the code reading sensor 20 provided in the cartridge chamber 13.

If the film 22 is discriminated to be an unexposed film based on the detection result of the position of the narrow-angle fan-shaped portion 143b of the display disk 143, i.e. of the state of the film 22, the film 22 is fed until the first frame reaches the image recording position (initial load). If the film 22 is discriminated to be partly exposed film, the film 22 is wound until the first unexposed frame reaches the image recording position by detecting by the magnetic head 36 whether or not the magnetic data is recorded in the frame magnetic recording portions 45.

Figure 12:
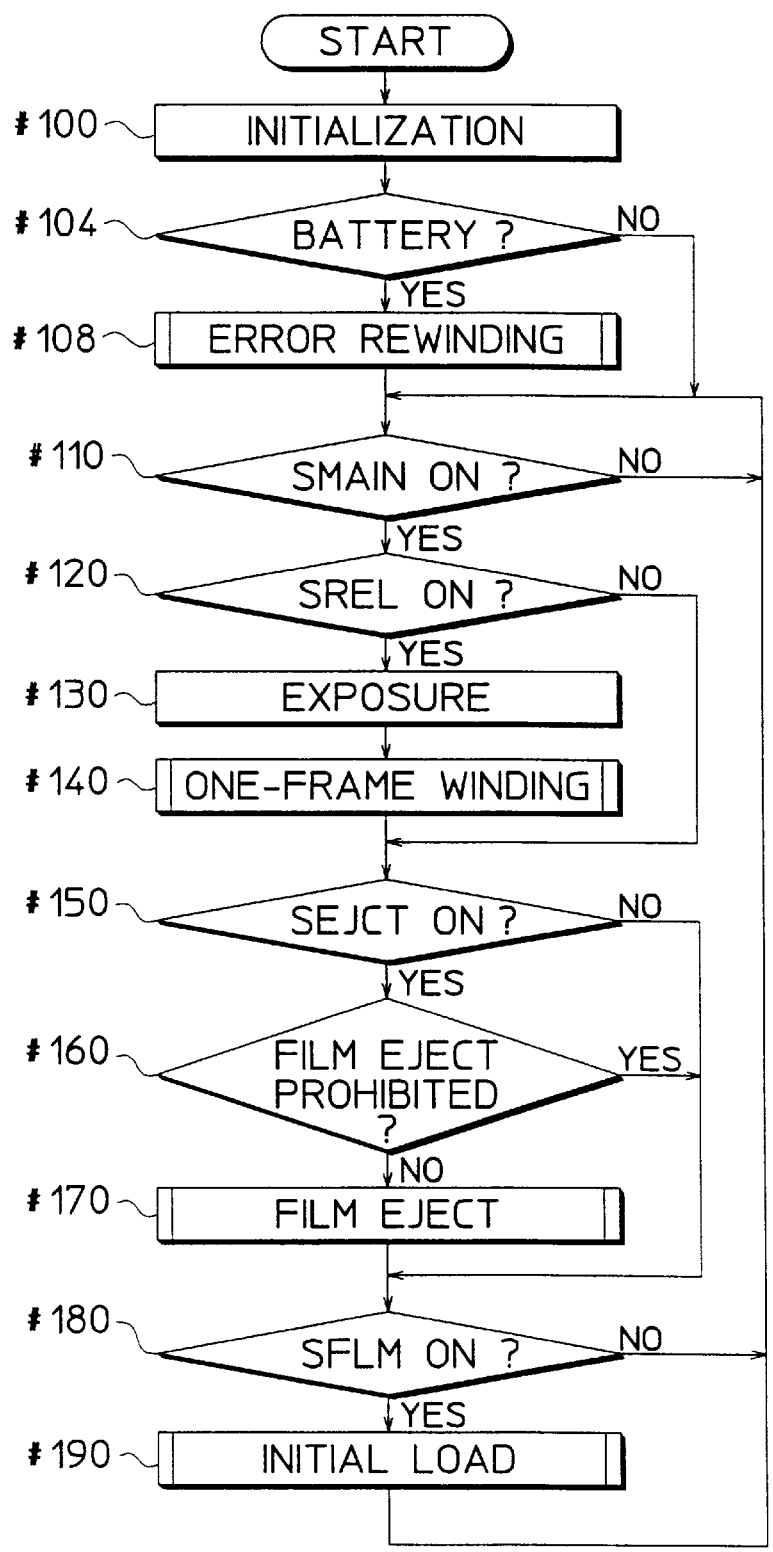
FIG. 12 is a flowchart showing a main routine of the camera.

Next, the operation procedure of the camera is described with reference to flowcharts of FIGS. 12 to 19. FIG. 12 is a flowchart showing a main routine.

When the battery 18 is loaded in the battery chamber 19 of the camera main body 11, the camera starts operating. First, a specified initialization processing including resetting of the RAM 62 and setting of a default value is performed (Step #100). Subsequently, only the wind or rewind start information is stored in the EEPROM 56. Whether or not the battery 18 was taken out while the film 22 was being fed is discriminated by discriminating whether or not the wind or rewind complete information is stored (Step #104). If the battery 18 has been taken out (YES in Step #104), Step #110 follows after executing a subroutine "Error Rewinding" to be described later (Step #108).

On the other hand, if the battery 18 has not been taken out (NO in Step #104), it is discriminated whether the main switch SMAIN is on (Step #110). If the main switch SMAIN is off (NO in Step #110), the main routine waits on standby. If the main switch SMAIN is on (YES in Step #110), it is discriminated whether the release switch SREL has been turned on (Step #120). If the release switch SREL is still off (NO in Step #120), Step #150 follows.

On the other hand, if the release switch SREL is turned on (YES in Step #120), a shutter releasing operation, i.e. the light measurement, the distance measurement and the exposure are performed (Step #130). Upon the completion of the shutter release operation, a subroutine "One-Frame Winding" to be described later is executed (Step #140).

Subsequently, it is discriminated whether the eject switch SEJCT has been turned on (Step #150). If the eject switch SEJCT is still off (NO in Step #150), Step #180 follows.

If the eject switch SEJCT is turned on (YES in Step #150), it is discrimination whether a film eject is prohibited (Step #160). Unless the film eject is prohibited (NO in Step #160), Step #180 follows after a subroutine "Film Eject" to be described later is executed (Step #170). If the film eject is prohibited (YES in Step #160), Step #180 directly follows.

It is then discriminated whether the switch SFLM has been turned off, i.e. whether the film 22 has been set in the camera main body 11 (Step #180). When the film 22 is set in the camera main body 11 (YES in Step #180), the main routine returns to Step #110 after a subroutine "Initial Load" to be described later is executed (Step #190). Unless the film 22 is set (NO in Step #180), the main routine directly returns to Step #110.

If, for example, the battery 18 is taken out during the winding of the film 22, the film 22 may not be fed frame by frame and, as a result, an unexposed frame may be present between the exposed frames. However, according to this embodiment, the information as to whether the film 22 is being fed is stored in the EEPROM 56 and a usual operation is performed only when the film 22 is not being fed as described above. Accordingly, the presence of the unexposed frame between the exposed frames can securely be prevented.

Figure 13:
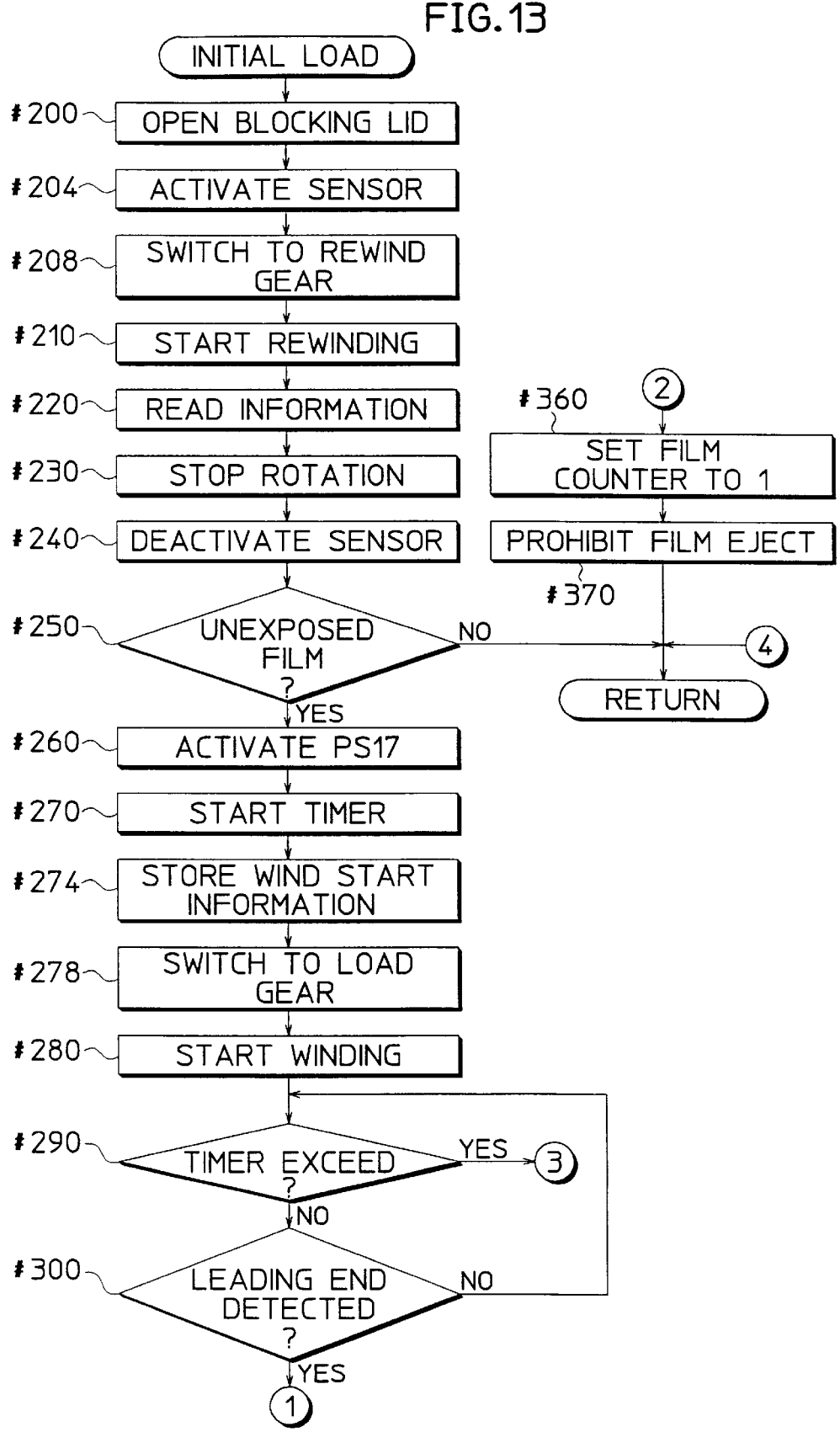
FIGS. 13 and 14 are a flowchart showing a subroutine "Initial Load" executed in Step #190 of the main routine.
Figure 14:
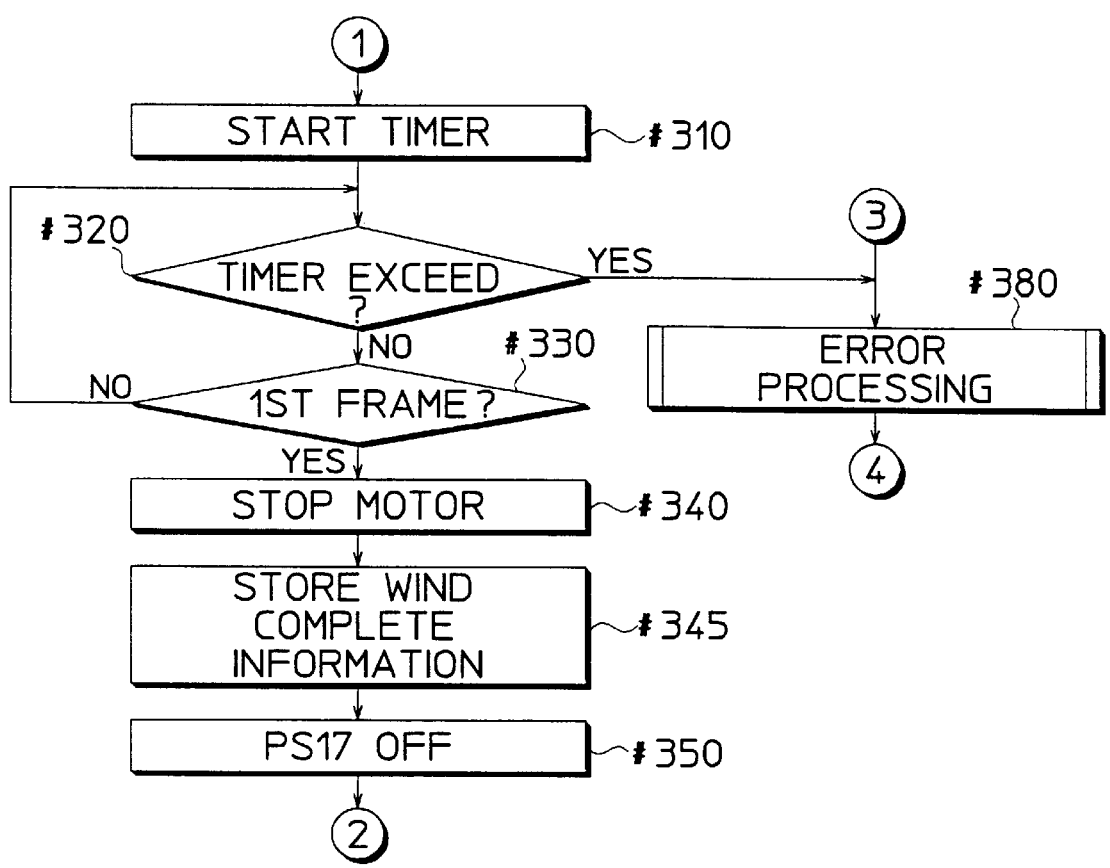

FIGS. 13 and 14 are a flowchart showing the subroutine "Initial Load" executed in Step #190 of FIG. 12.

First, the motor 14 is connected with the lid opening/closing gear device 33 and the light blocking lid 117 is opened by driving the opening key 13a (Step #200). Then, the code reading sensor 20 is activated (Step #204), and the connection of the motor 14 is switched to the one with the rewind gear device 32 (Step #208). The rotation of the film cartridge 21 in the rewinding direction is started (Step #210). During this rotation, the bar code on the data disk 142 is read; the angle defined by the reading start position and the end of the black zone BZ is detected, and the read information, the detected angle and the like are stored in the RAM 62 (Step #220). The rotation of the film cartridge 21 is then stopped (Step #230), and the code reading sensor 20 is deactivated (Step #240).

It is then discriminated based on the angle detected in Step #220 whether the set film 22 is an unexposed film (Step #250). This subroutine ends unless the film 22 is an unexposed film (NO in Step #250).

If the film 22 is an unexposed film (YES in Step #250), the PS 17 is activated (Step #260) and counting by a timer is started (Step #270). The wind start information is stored in the EEPROM 56 (Step #274); the connection of the motor 14 is switched to the one with the initial load gear device 34 (Step #278); and the rotation of the motor 14 in the winding direction is started to feed the film 22 (Step #280).

It is then discriminated whether a count value of the timer exceeds a preset value (Step #290). Unless a preset time is up (NO in Step #290), it is discriminated whether the leading end of the film 22 has been detected by the PS 17 (Step #300). This subroutine returns to Step #290 until the leading end of the film 22 is detected (NO in Step #300).

Upon detecting the leading end of the film 22 (YES in Step #300), the count value of the timer is reset to start the counting again (Step #310). It is then discriminated whether a count value of the timer exceeds a preset value (Step #320). Unless a preset time is up (NO in Step #320), it is discriminated whether the first frame of the film 22 has been detected by the PS 17 (Step #330). This subroutine returns to Step #320 until the first frame of the film 22 is detected (NO in Step #330).

Upon detecting the first frame of the film 22 (YES in Step #330), this subroutine ends after the driving of the motor 14 is stopped (Step #340); the wind complete information is stored in the EEPROM 56 (Step #345); the PS 17 is deactivated (Step #350); the film counter is set to "1" (Step #360); and the film eject is prohibited (Step #370).

If the count value of the timer exceeds the preset value before the leading end of the film 22 is detected (YES in Step #290), a subroutine "Error Processing" to be described is executed (Step #380) upon the judgment that an abnormality has occurred in the film feed and this subroutine ends.

If the count value of the timer exceeds the preset value before the first frame of the film 22 is detected (YES in Step #320), the subroutine "Error Processing" is executed (Step #380) upon the judgment that an abnormality has occurred in the film feed and this subroutine ends.

As described above, the wind start information is stored in the EEPROM 56 at the start of the initial load and the wind complete information is stored in the EEPROM 56 upon the completion of the initial load. Accordingly, in the case that the battery 18 is taken out during the feed of the film 22, such a fact can securely be discriminated.

Figure 15:
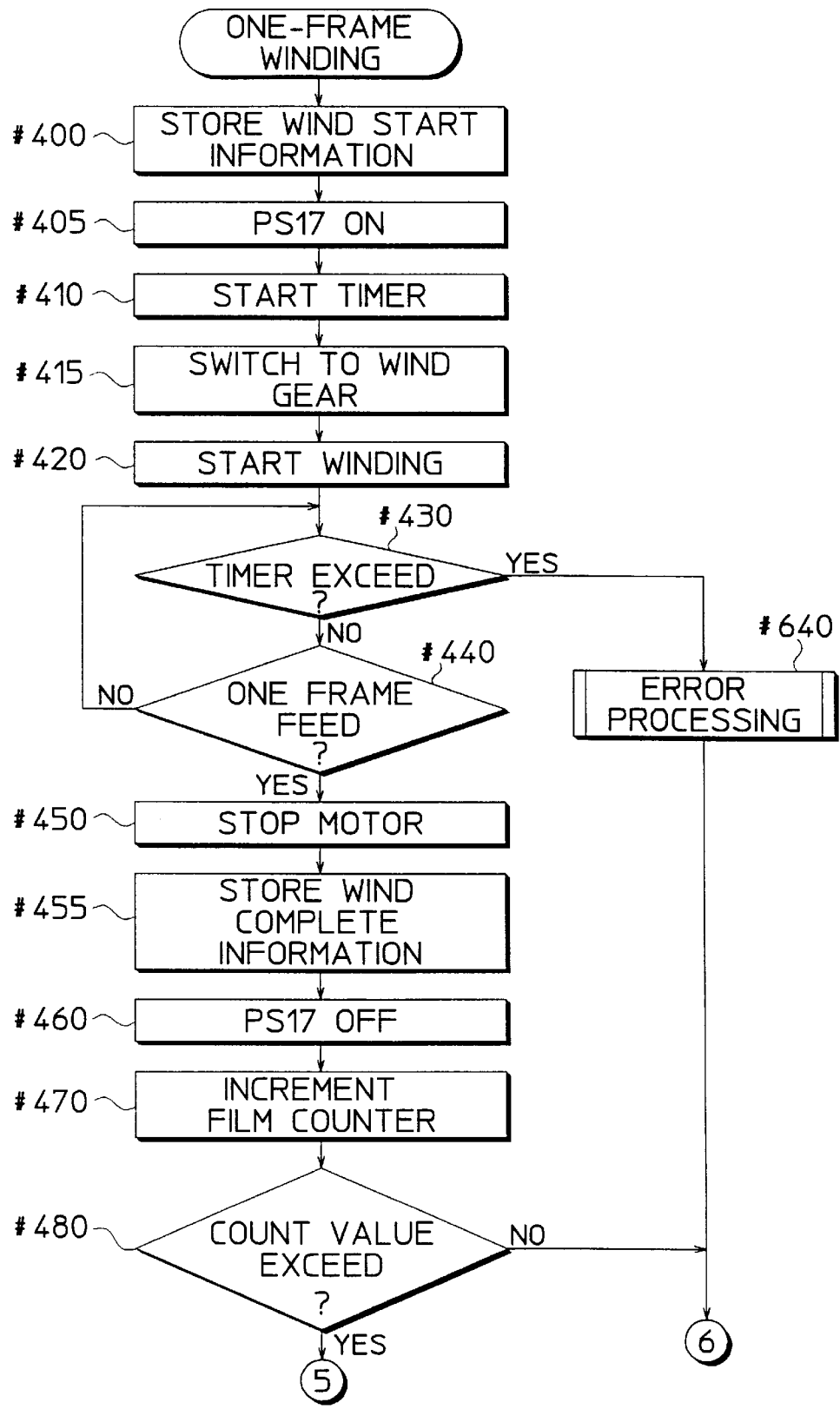
FIGS. 15 and 16 are a flowchart showing a subroutine "One-Frame Winding" executed in Step #140 of the main routine.
Figure 16:
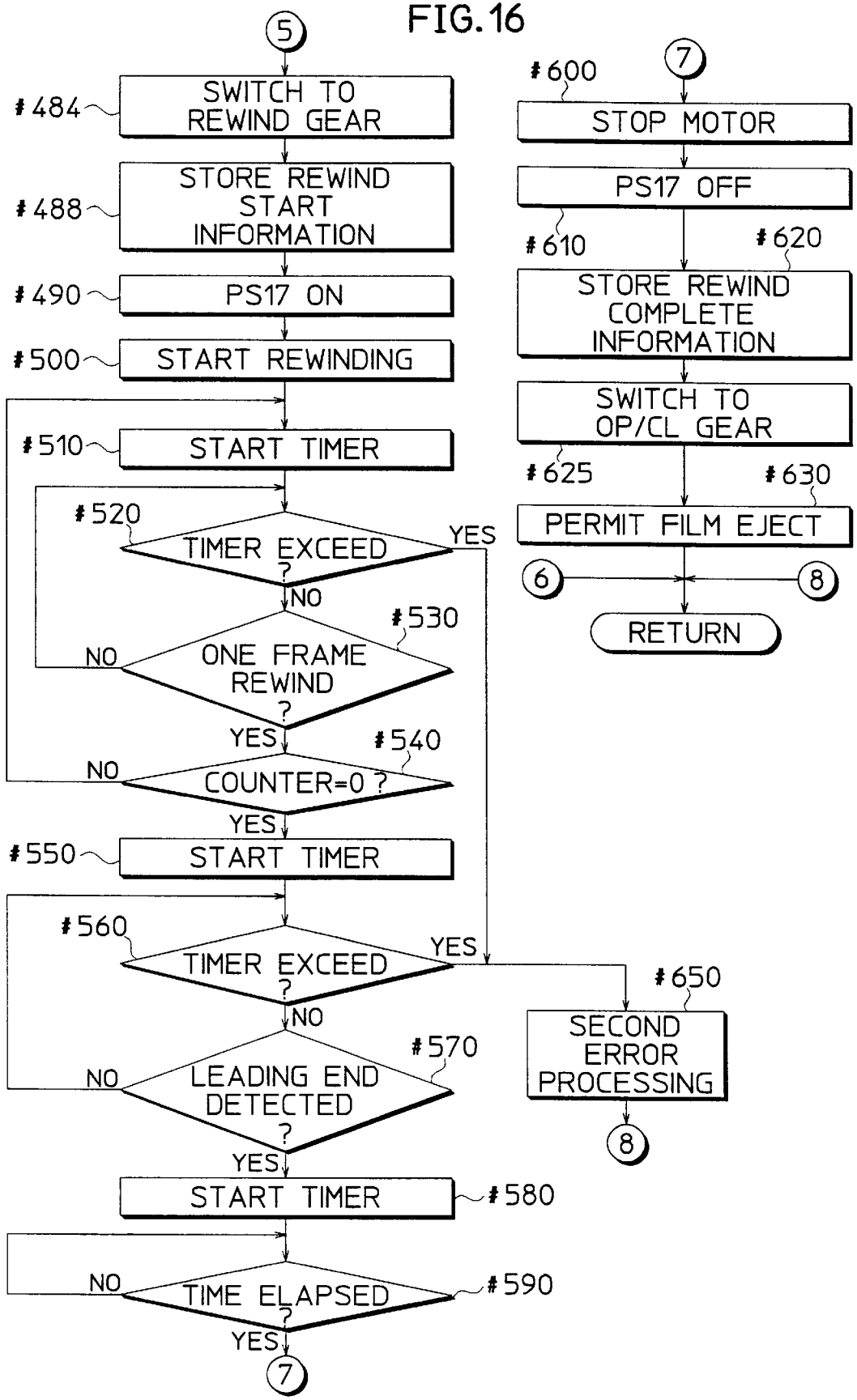

FIGS. 15 and 16 are a flowchart showing the subroutine "One-Frame Winding" executed in Step #140 of FIG. 12.

First, the wind start information is stored in the EEPROM 56 (Step #400), and the PS 17 is activated (Step #405). Subsequently, the counting by the timer is started (Step #410); the connection of the motor 14 is switched to the one with the wind gear device 35 (Step #415); and the winding of the film 22 is started (Step #420).

It is then discriminated whether the count value of the timer exceeds a preset value (Step #430). Unless a preset time is up (NO in Step #430), it is discriminated whether the PS 17 has detected that the film 22 was fed by one frame (Step #440). This subroutine returns to Step #430 until the PS 17 makes such a detection (NO in Step #440).

Upon detecting that the film 22 has been fed by one frame (YES in Step #440), the driving of the motor 14 is stopped (Step #450); the wind complete information is stored in the EEPROM 56 (Step #455); the PS 17 is deactivated (Step #460); and the count value of the film counter stored in the RAM 62 and displayed in the display device 55 is incremented by "1" (Step #470).

It is then discriminated whether the count value of the film counter exceeds a total frame number of the film 22 which is read in Step #220 of FIG. 13 and stored in the RAM 62 (Step #480). This subroutine ends unless the count value of the film counter exceeds the total frame number (NO in Step #480).

On the other hand, if the count value of the film counter exceeds the total frame number (YES in Step #480), the connection of the motor 14 is switched to the one with the rewind gear device 32 (Step #484); the rewind start information is stored in the EEPROM 56 (Step #488); the PS 17 is activated (Step #490); and the rewinding of the film 22 is started by starting the driving of the motor 14 (Step #500). Subsequently, the counting by the timer is started (Step #510).

It is then discriminated whether the count value of the timer exceeds a preset value (Step #520). Unless a preset time is up (NO in Step #520), it is discriminated whether the PS 17 has detected that the film 22 was fed by one frame by detecting the perforations 41, 42 (Step #530). This subroutine returns to Step #520 (NO in Step #530) until the PS 17 makes such a detection.

Upon detecting that the film 22 has been rewound by one frame (YES in Step #530), the count value of the film counter is decremented by "1". It is then discriminated whether the count value of the film counter became "0" by such a decrement, i.e. all frames have been rewound (Step #540). Unless the count value of the film counter is "0" (NO in Step #540), this subroutine returns to Step #510 and the aforementioned operations are repeated.

When the count value of the film counter becomes "0" (YES in Step #540), the counting by the timer is started (Step #550). It is then discriminated whether the count value of the timer exceeds a preset value (Step #560). Unless a preset time is up (NO in Step #560), it is discriminated whether the leading end of the film 22 has been detected by the PS 17 (Step #570). This subroutine returns to Step #560 until the leading end of the film 22 is detected by the PS 17 (NO in Step #570).

When the leading end of the film 22 is detected by the PS 17 (YES in Step #570), the count value of the timer is reset to start the counting again (Step #580). It is then discriminated whether a predetermined time T1 has elapsed (Step #590). The rewinding is continued until the predetermined time T1 elapses. Upon the elapse of the predetermined time T1 (YES in Step #590), the rewinding is stopped (Step #600). It should be noted that the predetermined time T1 is set at a time during which the leader portion 22a of the film 22 can securely be rewound into the film cartridge 21.

Subsequently, the PS 17 is deactivated (Step #610); the rewind complete information is stored in the EEPROM 56 (Step #620); the connection of the motor 14 is switched to the one with the lid opening/closing gear device 33 (Step #625); and consequently the film eject is permitted (Step #630).

If the count value of the timer exceeds the preset value before detecting that the film 22 has been wound by one frame (YES in Step #430), the subroutine "Error Processing" is executed (Step #640) upon the judgment that an abnormality has occurred in the film feed and this subroutine ends.

Further, if the count value of the timer exceeds the preset value before detecting that the film 22 has been rewound by one frame (YES in Step #520), the subroutine "Error Processing" is executed (Step #650) upon the judgment that an abnormality has occurred in the film feed and this subroutine ends.

Further, if the count value of the timer exceeds the preset value before the detection of the leading end of the film 22 (YES in Step #560), the subroutine "Error Processing" is executed (Step #650) upon the judgment that an abnormality has occurred in the film feed and this subroutine ends.

As described above, in Step #625, the connection of the motor 14 is switched from the one with the rewind gear device 32 to the one with the lid opening/closing gear device 33 upon the completion of rewinding of the film 22. Accordingly, the drive key 13b coupled with the rewind gear device 32 is brought into a free state, with the result that the film 22 tightly wound in the film cartridge 21 when the rewinding is completed can be loosened.

Figure 17:
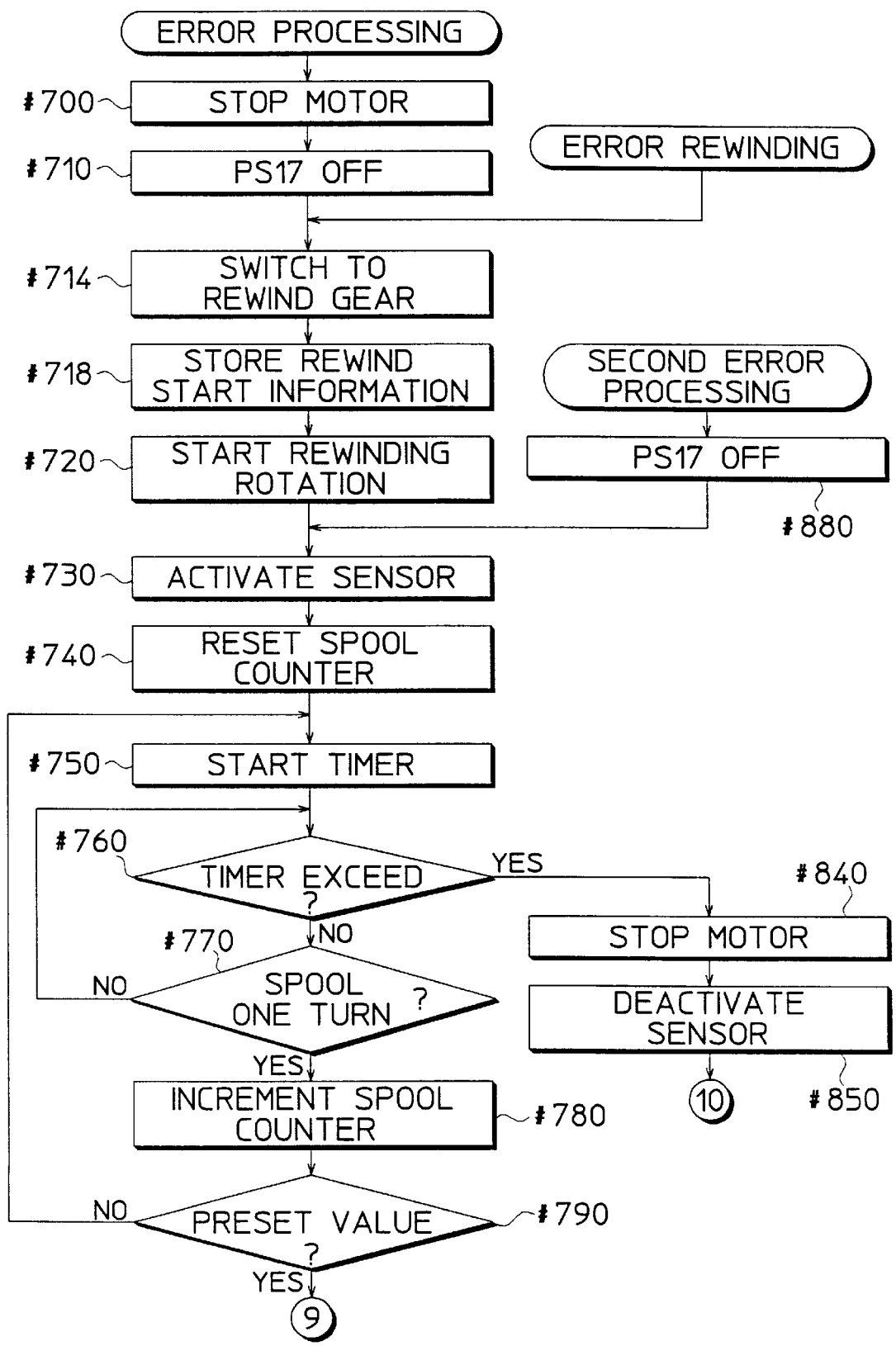

FIGS. 17 and 18 are a flowchart showing subroutines "Error Processing" executed in Step #380 of FIG. 14 and Step #640 of FIG. 15, "Second Error Processing" executed in Step #650 of FIG. 16 and "Error Rewinding" executed in Step #108 of FIG. 12.

First of all, the subroutine "Error Processing" is described.

The film feed is interrupted by stopping the motor 14 (Step #710), and the PS 17 is deactivated (Step #710). The connection of the motor 14 is then switched to the one with the rewind gear device 32 (Step #714); the rewind start information is stored in the EEPROM 56 (Step #718); and the rotation of the spool 141 in the rewinding direction is started (Step #720). Subsequently, the code reading sensor 20 is activated (Step #730); the spool rotation counter is reset to "0" (Step #740); and the counting by the timer is started (Step #750).

It is then discriminated whether the count value of the timer exceeds a preset value (Step #760). Unless a preset time is up (NO in Step #760), it is discriminated whether the spool 141 is detected to have made one turn by reading the data on the data disk 142 by the code reading sensor 20 (Step #770). This subroutine returns to Step #760 until such a detection is made (NO in Step #770).

Upon detecting that the spool 141 has made one turn (YES in Step #770), the spool rotation counter is incremented by "1" (Step #780).

Subsequently, it is discriminated whether the count value of the spool rotation counter has reached a preset value (a value corresponding to 40 frames in this embodiment) (Step #790). This subroutine returns to Step #750 to repeat the above operations until the count value of the spool rotation counter reaches this preset value (NO in Step #790).

When the count value of the spool rotation counter reaches the preset value (YES in Step #790), the motor 14 is stopped to stop the rewinding of the film 22 (Step #800).

The code reading sensor 20 is then deactivated (Step #810); the rewind complete information is stored in the EEPROM 56 (Step #820); and the connection of the motor 14 is switched to the one with the lid opening/closing gear device 33 (Step #825). Consequently, this subroutine ends after the film eject is permitted (Step #830).

On the other hand, if the count value of the timer exceeds the preset value before one turn of the spool 141 is detected (YES in Step #760), this subroutine ends after the motor 14 is stopped (Step #840) and the code reading sensor 20 is deactivated (Step #850).

Next, the subroutine "Second Error Processing" executed in Step #650 of FIG. 16 is described. First, this subroutine proceeds to Step #730 after the PS 17 is deactivated (Step #880). Since the same operations as the subroutine "Error Processing" are performed after Step #730, no description is repeated here.

The subroutine "Error Rewinding" executed in Step #108 of FIG. 12 is started in Step #714. Since the same operations as the subroutine "Error Processing" are performed after Step #714, no description is repeated here.

As can be read from the above, in the second rewind mode in which, when, for example, the perforations or the leading end of the film are not detected, the film 22 is rewound upon the judgment that an abnormality has occurred in the film feed, the number of rotation of the spool 141 is detected by reading the bar code on the data disk 142 by the code reading sensor 20 instead of continuing the driving of the motor 14 for the preset time. Accordingly, the film 22 can securely be rewound into the film cartridge 21 within a minimum necessary time.

FIG. 19 is a flowchart showing the subroutine "Film Eject" executed in Step #170 of FIG. 12.

First, the absence of the film cartridge 21 in the cartridge chamber 13 is discriminated based on the detection signal of the switch SFLM (Step #900). If the film cartridge 21 is not loaded in the cartridge chamber 13 (YES in Step #900), Step #956 follows. If the film cartridge 21 is loaded in the cartridge chamber 13 (NO in Step #900), the connection of the motor 14 is switched to the one with the rewind gear device 32 (Step #905) and the code reading sensor 20 is activated (Step #910).

Subsequently, the motor 14 is driven to start the rotation of the spool 141 in the rewinding direction (Step #920). It is then discriminated by reading the bar code on the data disk 142 by the code reading sensor 20 whether the narrow-angle fan-shaped portion 143b of the display disk 143 is set in a specified position where it faces the opening 135 indicating that the film 22 is exposed (Step #930). The driving of the motor 14 is continued until the fan-shaped portion 143b is set in the specified position (NO in Step #930). When the fan-shaped portion 143b is set in the specified position (YES in Step #930), the motor 14 is stopped (Step #940) and the code reading sensor 20 is deactivated (Step #950).

Subsequently, the connection of the motor 14 is switched to the one with the lid opening/closing gear device 33 (Step #952), and the motor 14 is driven to close the light blocking lid 117 (Step #954).

The connection of the motor 14 is then switched to the one with the eject gear device 31 (Step #956); the motor 14 is driven to start the ejection of the film cartridge 21 (Step #960); and the counting by the timer is started (Step #970).

It is then discriminated whether a predetermined time T2 has elapsed (Step #980). The driving of the motor 14 is continued until the predetermined time T2 elapses (NO in Step #980). Upon the elapse of the predetermined time T2 (YES in Step #980), this subroutine ends after the driving of the motor 14 is stopped (Step #990). It should be noted that the predetermined time T2 is set at a time necessary for the film cartridge 21 in the cartridge chamber 13 to be pressed out of the cartridge chamber 13.

As described above, the display disk 143 is set in the specified position after the eject switch SEJCT is turned on (YES in Step #150 of FIG. 12) and immediately before the film cartridge 21 is ejected after the light blocking lid 117 is closed. Accordingly, the film cartridge 21 can be taken out with the display disk 143 set in an accurate position.

In the case that the display disk 143 is set in the specified position following the completion of rewinding of the film 22, if the film cartridge 21 is left in the cartridge chamber 13 for a long time before being ejected, the display disk 143 may be rotated upon being subjected to vibrations and impacts applied thereto during that time and may be displaced from its set position. However, this embodiment can prevent such an undesirable event.

Further in the case that the display disk 143 is set in the specified position following the completion of rewinding of the film 22 and the motor 14 is left connected with the rewind gear device 32, when the drive key 13b is brought into its free state upon switching the connection of the motor 14 from the one with the rewind gear device 32 to the one with the lid opening/closing gear device 33 in order to close the light blocking lid 117, the film 22 tightly wound in the film cartridge 21 after the completion of rewinding may be loosened, thereby causing the display disk 143 to rotate to be displaced from its set position. However, this embodiment can also prevent such an undesirable event.

As described above, according to the invention, the drive source is connected with the spool; a torque is transmitted from the drive source to the spool to rewind the film into the film cartridge; and the spool is rotated until the display disk reaches a position in conformity with the used state of the film after the drive source and the spool are disconnected by the connection means upon the completion of rewinding of the film. Accordingly, the display disk can securely be held in its rotation stop position even despite the loosening of the film tightly wound around the spool by the rewinding of the film.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera loadable with a film cartridge having a rotary spool connected with a film and a display member rotatable with the rotary spool for displaying a used state of the film, the camera comprising:

a driver which generates a driving force for rotation of the rotary spool;

a transmission device which is operable to execute transmission of the driving force from the driver to the rotary spool; and a controller which controls the transmission device to execute the transmission of the driving force to rotate the rotary spool for rewinding of the film into the film cartridge, and to suspend the transmission of the driving force to allow the rewound film to freely loosen, and to subsequently execute the transmission of the driving force to rotate the rotary spool until the display member reaches a position to display a specified used state of the film.

2. A camera according to claim 1, further comprising a take-up spool which winds the film from the film cartridge, wherein:

the transmission device is operable to execute transmission of the driving force from the driver to the take-up spool; and the controller controls the transmission of the driving force to the take-up spool in combination with the transmission of the driving force to the rotary spool.

3. A camera according to claim 1, wherein the film cartridge further comprises a locking device which locks the display member in the position to display the specified used state of the film.

4. A camera according to claim 1, wherein the display member is provided with a plurality of colors to define a used state of the film.

5. A camera according to claim 4, wherein the display member is placed in a casing formed with an opening, whereby displaying a used state of the film is achieved by a combination of the plurality of colors and the opening.

6. A camera according to claim 1, wherein the display member displays an unexposed state, a partly exposed state, a completely exposed state, and a developed state of the film.

7. A camera according to claim 6, wherein the display member is provided with a plurality of colors and placed in a casing formed with four openings having different shapes from one another, the four colors being provided in such an arrangement that the same color is seen through the three openings while a different color is seen through the remaining one opening.

8. A camera loadable with a film cartridge having a rotary spool connected with a film and a display member rotatable with the rotary spool, the display member being provided with a plurality of colors and placed in a casing formed with a plurality of openings having different shapes from one another to display a used state of the film by a combination of the plurality of colors and the plurality of openings, the film cartridge further comprising a locking device which locks the display member in a position to display a specified used state of the film, the camera comprising:

a motor which generates a driving force for rotation of the rotary spool;

a transmission mechanism including:
  transmission gears, and
  a connector provided between transmissions gears for connecting and disconnecting them to execute and suspend transmission of the driving force from the motor to the rotary spool; and a controller which controls the connector to connect the transmission gears to execute the transmission of the driving force to the rotary spool for rewinding of the film into the film cartridge, and to disconnect the transmission gears to suspend the transmission of the driving force to allow the rewound film to freely loosen, and to subsequently connect the transmission gears to execute the transmission of the driving force to rotate the rotary spool until the display member reaches a position to display a specified used state of the film.

9. A camera loadable with a film cartridge having a rotary spool connected with a film and a display member rotatable with the rotary spool for displaying a used state of the film, the camera comprising:

an ejector which ejects the loaded film cartridge;

an operating member which commands a film cartridge ejection of the ejector;

a driver which drives the rotary spool; and a controller which is responsive to the operating member and controls the driver to rotate the rotary spool until the display member reaches a position to display a specified used state of the film when the operating member is activated.

10. A camera according to claim 9, wherein the film cartridge further comprises a locking device which locks the display member in the position to display the specified used state of the film.

11. A camera according to claim 9, wherein the display member is provided with a plurality of colors to define a used state of the film.

12. A camera according to claim 11, wherein the display member is placed in a casing formed with an opening, whereby displaying a used state of the film is achieved by a combination of the plurality of colors and the opening.

13. A camera according to claim 9, wherein the display member displays an unexposed state, a partly exposed state, a completely exposed state, and a developed state of the film.

14. A camera according to claim 13, wherein the display member is provided with a plurality of colors and placed in a casing formed with four openings having different shapes from one another, the four colors being provided in such an arrangement that the same color is seen through the three openings while a different color is seen through the remaining one opening.

15. A camera loadable with a film cartridge having a rotary spool connected with a film and a display member rotatable with the rotary spool, the display member being provided with a plurality of colors and placed in a casing formed with a plurality of openings having different shapes from one another to display a used state of the film by a combination of the plurality of colors and the plurality of openings, the film cartridge further comprising a locking device which locks the display member in a position to display a specified used state of the film, the camera comprising:

an ejector which ejects the loaded film cartridge;

a switch which commands a film cartridge ejection of the ejector;

a motor which drives the rotary spool; and a controller which is responsive to the switch and controls the motor to rotate the rotary spool until the display member reaches a position to display a specified used state of the film when the switch is activated.

16. A method for actuating a display member rotatable with a film-connected rotary spool of a film cartridge loaded in a camera to display a used state of the film, the method comprising the steps of:

rotating the rotary spool to rewind the film into the film cartridge;

suspending the rotation of the rotary spool to allow the rewound film to freely loosen; and rotating the rotary spool until the display member reaches a position to display a specified used state of the film.

17. A method according to claim 16, further comprising the step of locking the display member in the position.

18. A method for actuating a display member rotatable with a film-connected rotary spool of a film cartridge loaded in a camera to display a used state of the film, the method comprising the steps of:

checking whether the film cartridge is commanded to be ejected;

rotating the rotary spool until the display member reaches a position to display a specified used state of the film when the film cartridge is commanded to be ejected; and ejecting the film cartridge.

19. A method according to claim 18, further comprising the step of locking the display member in the position before ejecting the film cartridge.

* * * * *